US012230463B2

(12) United States Patent
Tsukada et al.

(10) Patent No.: US 12,230,463 B2
(45) Date of Patent: Feb. 18, 2025

(54) ELECTROMAGNETIC RELAY WITH SHORT CIRCUIT PREVENTING FEATURES

(71) Applicant: OMRON Corporation, Kyoto (JP)

(72) Inventors: Takashi Tsukada, Kyoto (JP); Takeshi Nishida, Kyoto (JP); Kazuki Furukawa, Kyoto (JP); Naoki Kawaguchi, Kyoto (JP)

(73) Assignee: OMRON CORPORATION, Kyoto (JP)

(*) Notice: Subject to any disclaimer, the term of this patent is extended or adjusted under 35 U.S.C. 154(b) by 0 days.

(21) Appl. No.: 17/690,002

(22) Filed: Mar. 9, 2022

(65) Prior Publication Data

US 2022/0293374 A1 Sep. 15, 2022

(30) Foreign Application Priority Data

Mar. 15, 2021 (JP) ................................ 2021-041698

(51) Int. Cl.
*H01H 50/04* (2006.01)
*H01H 9/44* (2006.01)
(Continued)

(52) U.S. Cl.
CPC .......... *H01H 50/041* (2013.01); *H01H 50/14* (2013.01); *H01H 50/20* (2013.01); *H01H 50/58* (2013.01); *H01H 9/443* (2013.01)

(58) Field of Classification Search
None
See application file for complete search history.

(56) References Cited

U.S. PATENT DOCUMENTS 5,546,061 A * 8/1996 Okabayashi ........... H01H 9/443 335/126
7,157,996 B2 * 1/2007 Enomoto ............... H01H 50/02 335/126
(Continued)

FOREIGN PATENT DOCUMENTS

CN 112470244 A 3/2021
JP 3321963 B2 9/2002
(Continued)

OTHER PUBLICATIONS

The Office Action of the corresponding Korean application No. 10-2022-0017469 issued on Mar. 19, 2024.
(Continued)

*Primary Examiner* — Bernard Rojas
(74) *Attorney, Agent, or Firm* — SHINJYU GLOBAL IP

(57) ABSTRACT

An electromagnetic relay includes a support member, a first fixed terminal, a second fixed terminal, a movable contact piece, a movable member. The support member is made of an insulating material. The first fixed terminal includes a first fixed contact and is supported by the support member. The second fixed terminal includes the second fixed contact and is supported by the support member. The movable contact piece includes a first movable contact and a second movable contact. The movable member is connected to the movable contact piece and includes a first overlapping portion made of an insulating material. The first overlapping portion is disposed between the first fixed terminal and the second fixed terminal. The first overlapping portion overlaps with the support member when viewed from a longitudinal direction of the movable contact piece in an open state where the first movable contact is separated from the first fixed contact.

6 Claims, 8 Drawing Sheets

(51) Int. Cl.

| | |
|---|---|
| ***H01H 50/14*** | (2006.01) |
| ***H01H 50/20*** | (2006.01) |
| ***H01H 50/58*** | (2006.01) |

(56) References Cited

U.S. PATENT DOCUMENTS

| | | | | |
|---|---|---|---|---|
| 2011/0156846 | A1 | 6/2011 | Yeon | |
| 2021/0304991 | A1 | 9/2021 | Otsuka et al. | |
| 2022/0293373 | A1* | 9/2022 | Nishida | H01H 50/546 |
| 2022/0293381 | A1* | 9/2022 | Nishida | H01H 9/443 |

FOREIGN PATENT DOCUMENTS

| | | | |
|---|---|---|---|
| JP | 2012-199133 | A | 10/2012 |
| JP | 2020-173939 | A | 10/2020 |

OTHER PUBLICATIONS

Office Action of the corresponding Chinese Application No. 202210136940.8 mailed on Dec. 12, 2024.

* cited by examiner

ELECTROMAGNETIC RELAY WITH SHORT CIRCUIT PREVENTING FEATURES

This application claims priority to Japanese Patent Application No. 2021-041698, filed Mar. 15, 2021. The contents of that application are incorporated by reference herein in their entirety.

FIELD

The present invention relates to an electromagnetic relay.

BACKGROUND

The electromagnetic relay disclosed in Japanese Unexamined Patent Application Publication No. 2020-173939 includes a housing body in which a first fixed terminal and a second fixed terminal are fixed, and a first partition wall and a second partition wall protruding from the housing body. The first partition wall and the second partition wall suppress a short circuit between the first fixed terminal and the second fixed terminal.

SUMMARY

In the electromagnetic relay, when a contact is returned from a closed state to an open state, an insulation performance deteriorates due to the influence of a high temperature gas generated by an arc when the cutoff time becomes long. In particular, when the high temperature gas stays in the space between the first partition wall and the second partition wall, the insulation performance between the first fixed terminal and the second fixed terminal is deteriorated, and there is a risk of a short circuit between the first fixed terminal and the second fixed terminal.

An object of the present invention is to prevent a short circuit between a first fixed terminal and a second fixed terminal in an electromagnetic relay.

The electromagnetic relay according to one aspect of the present invention includes a support member, a first fixed terminal, a second fixed terminal, a movable contact piece, a movable member. The support member is made of an insulating material. The first fixed terminal includes a first fixed contact and is supported by the support member. The second fixed terminal includes the second fixed contact and is supported by the support member at a position apart from the first fixed terminal. The movable contact piece includes a first movable contact facing the first fixed contact and a second movable contact facing the second fixed contact. The movable member is connected to the movable contact piece. The movable member includes a first overlapping portion. The first overlapping portion is made of an insulating material and is disposed between the first fixed terminal and the second fixed terminal. The first overlapping portion overlaps with the support member when viewed from a longitudinal direction of the movable contact piece in an open state where the first movable contact is separated from the first fixed contact.

In this electromagnetic relay, in an open state where the first movable contact is separated from the first fixed contact, the overlapping portion of the movable member overlaps with the support member in the longitudinal direction of the movable contact piece between the first fixed terminal and the second fixed terminal. Therefore, it is possible to suppress a high temperature gas from staying between the first fixed terminal and the second fixed terminal. Thus, it is possible to suppress deterioration of the insulation performance between the first fixed terminal and the second fixed terminal due to the high temperature gas. As a result, it is possible to prevent a short circuit between the first fixed terminal and the second fixed terminal.

The movable member may further include a second overlapping portion made of an insulating material. The second overlapping portion may be disposed between the first fixed terminal and the second fixed terminal. The second overlapping portion may overlap with the first fixed contact when viewed from the longitudinal direction of the movable contact piece in the open state. The second overlapping portion may protrude from the first fixed contact in a lateral direction of the movable contact piece when viewed from the longitudinal direction of the movable contact piece. In this case, it is possible to further prevent the short circuit between the first fixed terminal and the second fixed terminal by the second overlapping portion.

The movable member may be configured to move in a moving direction including a first direction from the first movable contact toward the first fixed contact and a second direction from the first fixed contact toward the first movable contact. The support member may include a guide portion configured to guide movement of the movable member in the moving direction. The first overlapping portion of the movable member may slide with respect to the guide portion. In this case, since the first overlapping portion overlapping the support member in the longitudinal direction of the movable contact piece is guided by the guide portion, the contact between the first movable contact and the first fixed contact, and the contact between the second movable contact and the second fixed contact are stabilized.

The movable member may be restricted from rotating around an axis along the moving direction by the guide portion. Also in this case, the contact between the first movable contact and the first fixed contact, and the contact between the second movable contact and the second fixed contact are stabilized.

The electromagnetic relay may further include a return spring disposed between the support member and the movable member and configured to urge the movable member in the second direction. The first overlapping portion of the movable member may include a spring housing portion configured to house the return spring and opening toward the first direction. In this case, it is possible to suppress the return spring from being affected by the arc.

The support member may include a wall portion disposed between the first fixed terminal and the second fixed terminal. The first overlapping portion may have a shape surrounding the wall portion from the longitudinal direction of the movable contact piece. Also in this case, since the first overlapping portion overlaps the support member in the longitudinal direction of the movable contact piece between the first fixed terminal and the second fixed terminal, it is possible to suppress the high temperature gas from staying between the first fixed terminal and the second fixed terminal.

The wall portion of the support member may include a magnet housing portion configured to house a permanent magnet. In this case, the wall portion can suppress the high temperature gas from staying between the first fixed terminal and the second fixed terminal, and the wall portion can be used as a member for accommodating the permanent magnet.

DETAILED DESCRIPTION

Hereinbelow, an embodiment of an electromagnetic relay according to one aspect of the present invention will be described with reference to the drawings. Note that in each drawing, the X1 direction will be described as the left direction, the X2 direction as the right direction, the Y1 direction as the front direction, the Y2 direction as the rear direction, the Z2 direction as the upward direction, and the Z1 direction as the downward direction. In the present embodiment, the Z1 direction is an example of the first direction, and the Z2 direction is an example of the second direction. It should be noted that these directions are defined for convenience of explanation, and do not limit the arrangement direction of the electromagnetic relay.

Figure 1:
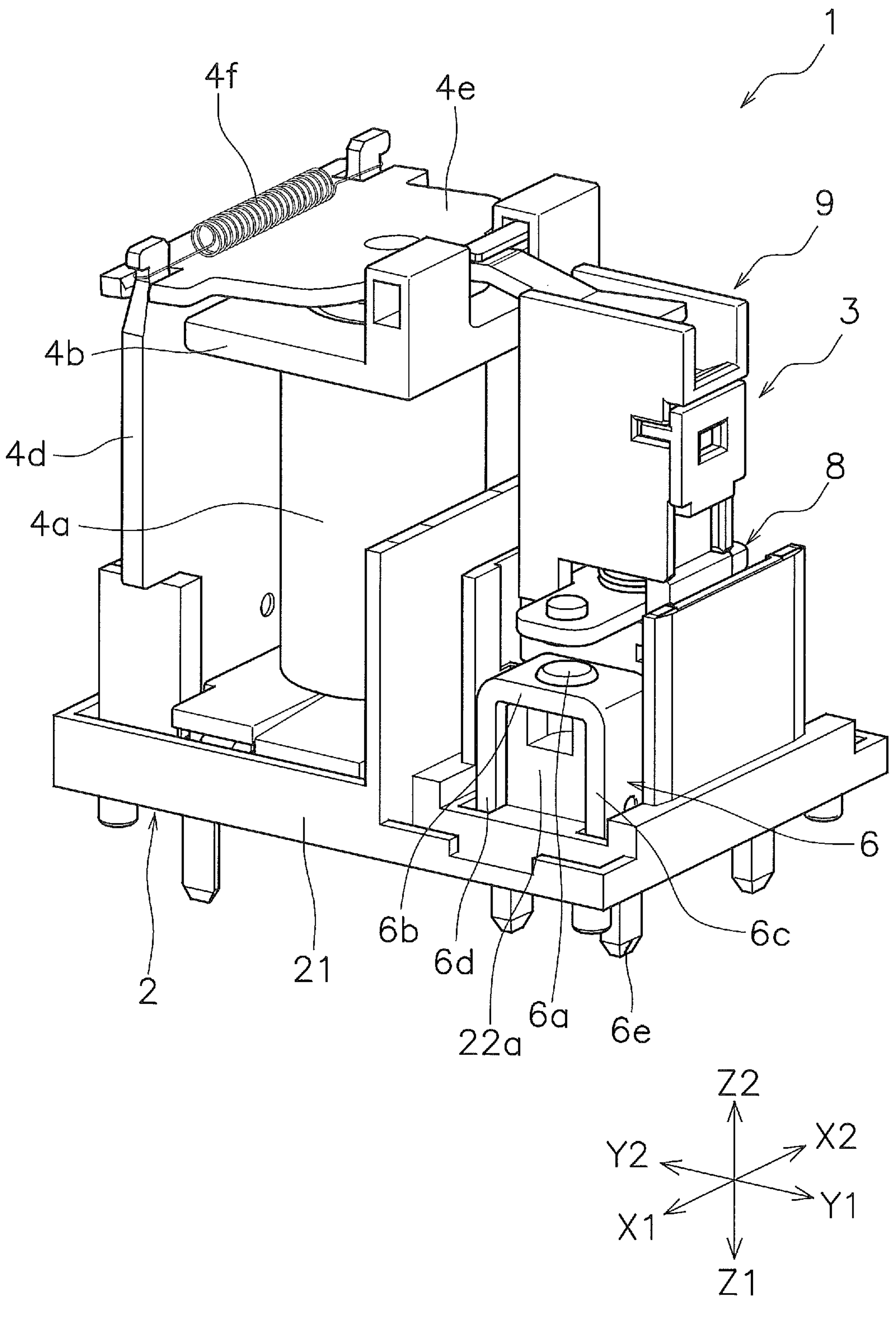
FIG. 1 is a perspective view of an electromagnetic relay.
Figure 2:
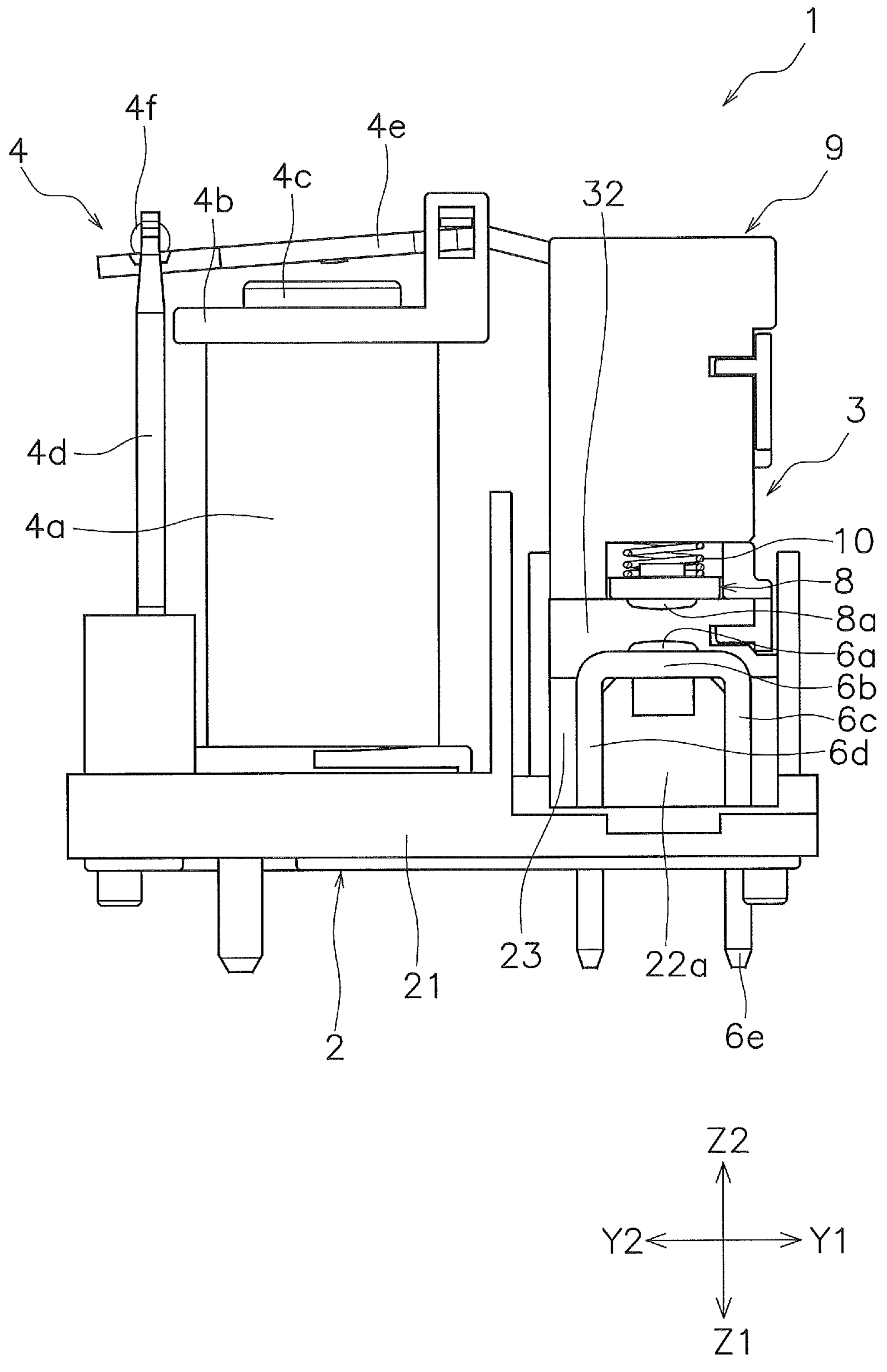
FIG. 2 is a side view of the electromagnetic relay.

As illustrated in FIGS. 1 and 2, the electromagnetic relay 1 includes a base 2, a contact device 3, and a drive device 4. The base 2 is an example of a support member. The base 2 is made of an insulating material such as resin. The base 2 has a rectangular shape when viewed from the up-down direction. The base 2 supports the contact device 3 and the drive device 4. The contact device 3 and the drive device 4 are covered by a case (not shown) attached to the base 2.

Figure 3:
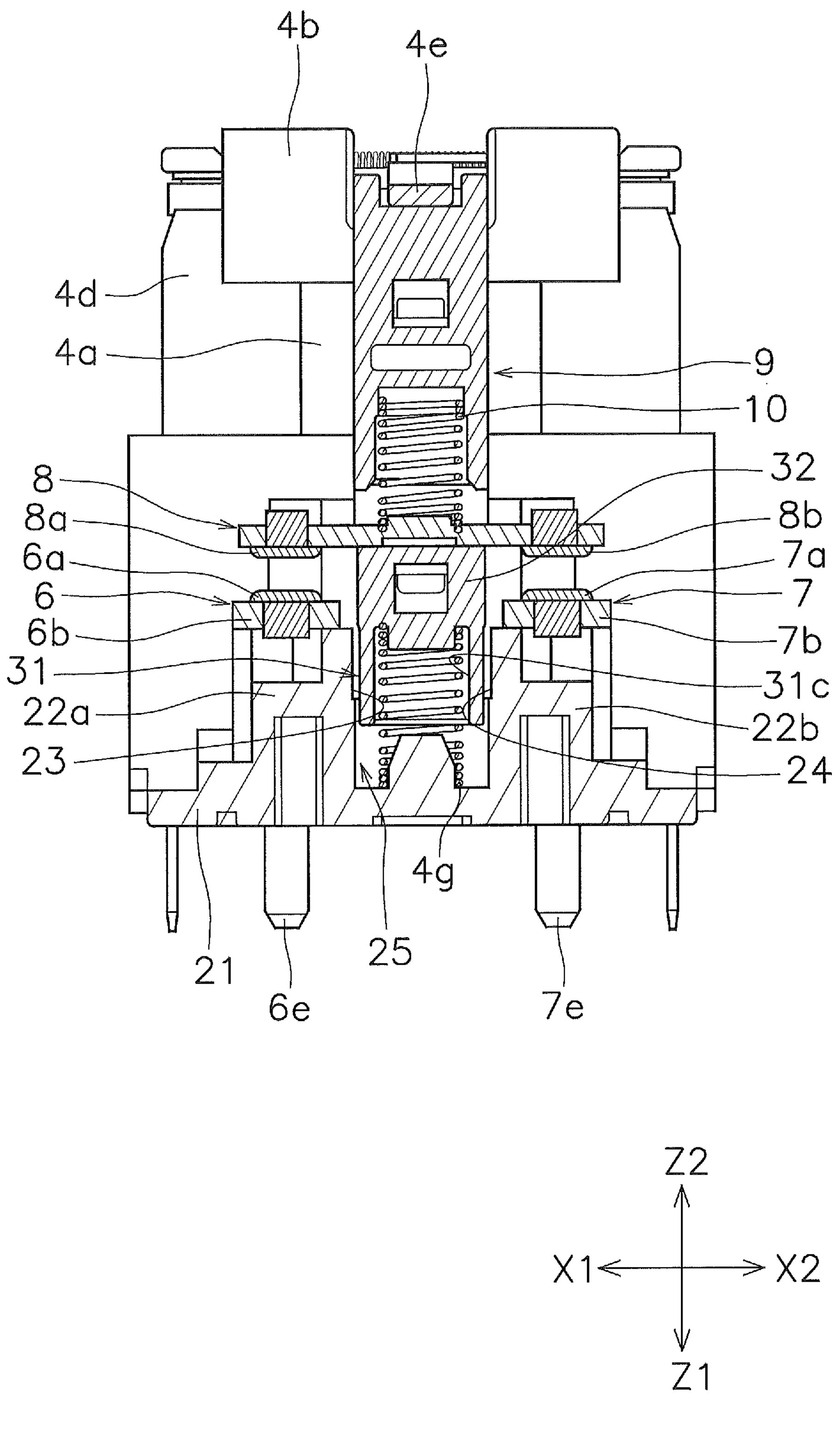
FIG. 3 is a cross-sectional view of the electromagnetic relay cut along a plane orthogonal to the front-rear direction.
Figure 4:
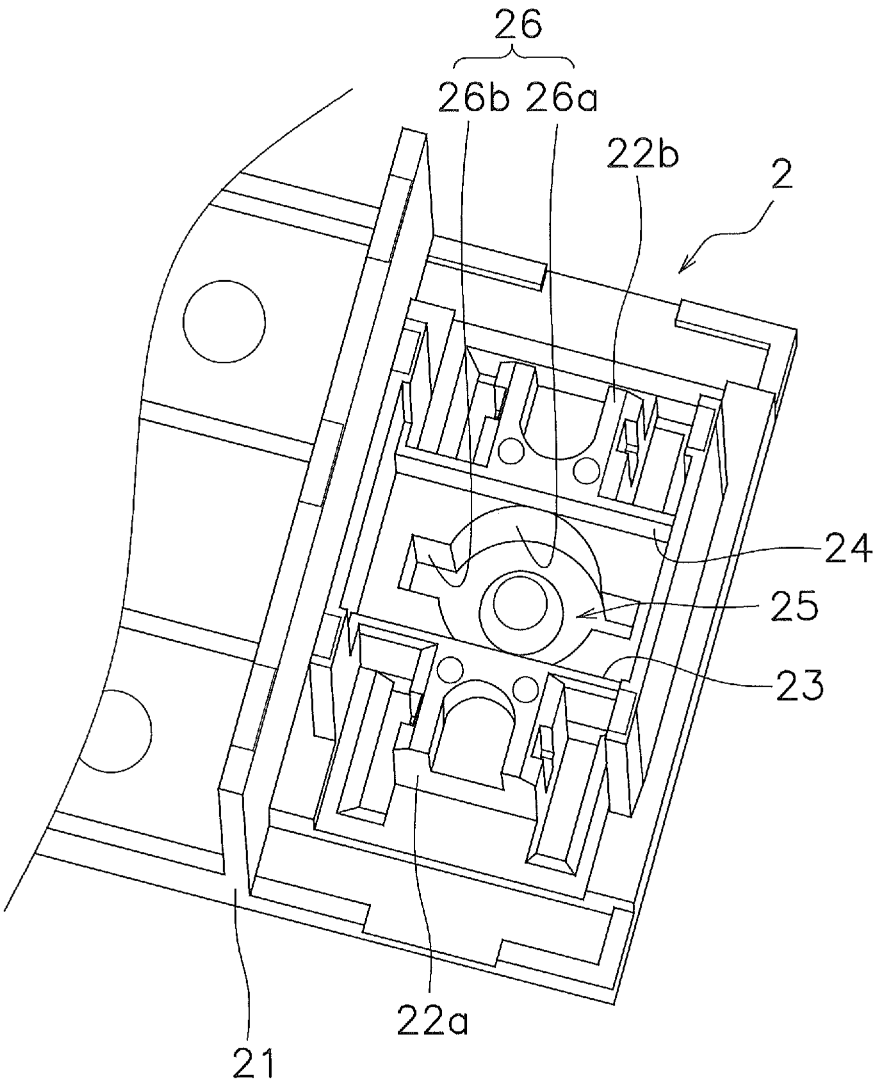
FIG. 4 is a partial perspective view of a base.
Figure 5:
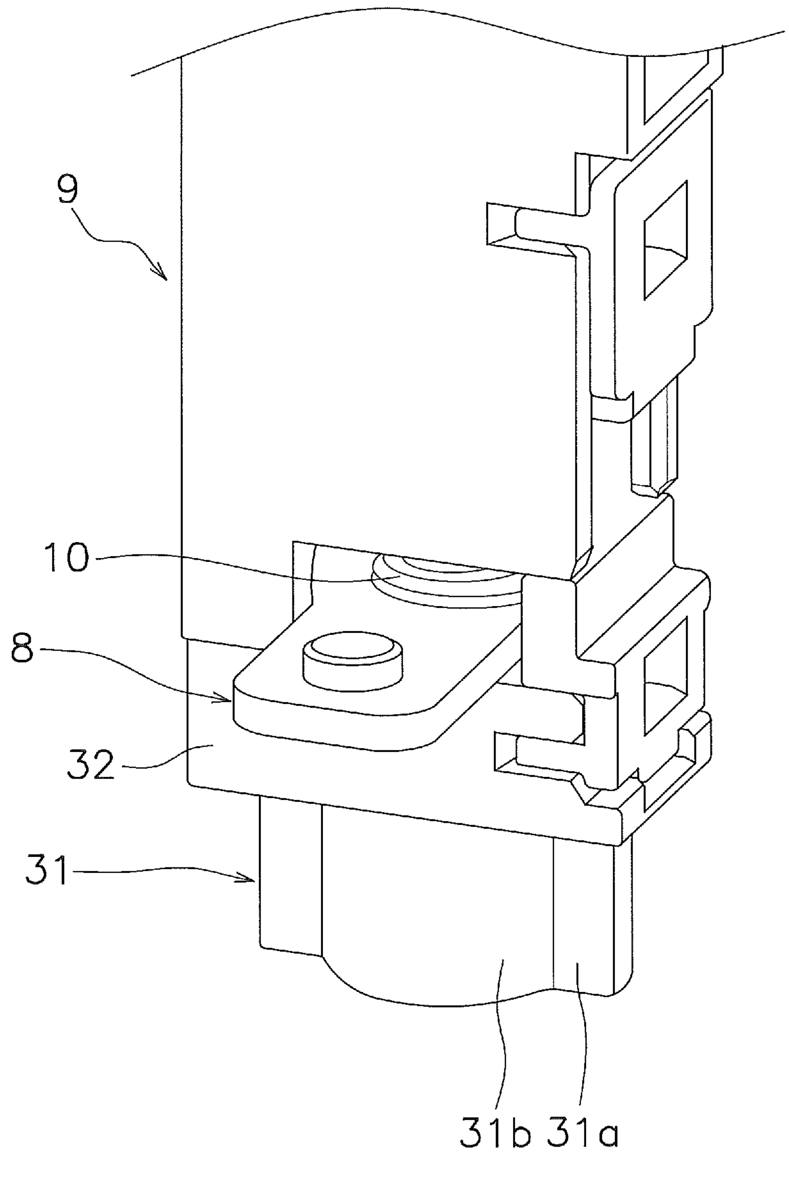
FIG. 5 is a partial perspective view of a movable member.

FIG. 3 is a cross-sectional view of the contact device 3 cut along a plane orthogonal to the front-rear direction. FIG. 4 is a partial perspective view of the base 2. The base 2 includes a bottom portion 21, terminal support portions 22*a* and 22*b*, a first wall portion 23, and a second wall portion 24. The bottom portion 21 has a rectangular shape when viewed from the up-down direction.

The terminal support portions 22*a* and 22*b* are formed so as to protrude upward from the bottom portion 21. The terminal support portion 22*a* is disposed apart from the terminal support portion 22*b* in the left-right direction. The upper surfaces of the terminal support portions 22*a* and 22*b* include flat surfaces orthogonal to each other in the up-down direction.

The first wall portion 23 is disposed adjacent to the terminal support portion 22*a* on the right side of the terminal support portion 22*a*. The first wall portion 23 extends in a direction orthogonal to the left-right direction. The first wall portion 23 protrudes upward from the bottom portion 21 and extends in the front-rear direction. The first wall portion 23 extends in the front-rear direction from the terminal support portion 22*a*. The height of the first wall portion 23 from the bottom portion 21 is about the same as the height from the bottom portion 21 to the terminal support portion 22*a*. The second wall portion 24 is left-right symmetrical with the first wall portion 23 and faces the first wall portion 23 in the left-right direction. The second wall portion 24 is disposed adjacent to the terminal support portion 22*b* on the left side of the terminal support portion 22*b*.

The contact device 3 includes a first fixed terminal 6, a second fixed terminal 7, a movable contact piece 8, a movable member 9, and a contact spring 10. The first fixed terminal 6, the second fixed terminal 7, and the movable contact piece 8 are plate-shaped terminals and are made of a conductive material such as copper.

The first fixed terminal 6 and the second fixed terminal 7 have a U-shaped cross section, and when viewed from the left-right direction have a shape bent in a U-shape. The first fixed terminal 6 and the second fixed terminal 7 are supported by the base 2. The first fixed terminal 6 and the second fixed terminal 7 are fixed by being press-fitted into the base 2, for example.

The first fixed terminal 6 includes a first fixed contact 6*a*, a contact support portion 6*b*, a first extending portion 6*c*, a second extending portion 6*d*, a pair of external connection portions 6*e*. The first fixed contact 6*a* is disposed on the contact support portion 6*b*. The first fixed contact 6*a* is fixed by being caulked to the first fixed terminal 6.

The contact support portion 6*b* is supported by the upper surface of the terminal support portion 22*a*. The contact support portion 6*b* extends in a direction orthogonal to the up-down direction. The contact support portion 6*b* supports the first fixed contact 6*a*. The first fixed contact 6*a* is fixed by being caulked to the contact support portion 6*b*. The first fixed contact 6*a* may be integrated with the first fixed terminal 6.

The first extending portion 6*c* and the second extending portion 6*d* are fixed by being press-fitted into the bottom portion 21 of the base 2. The first extending portion 6*c* is connected to the contact support portion 6*b* and protrudes outward from the base 2. The first extending portion 6*c* bends downward from the front end of the contact support portion 6*b* and protrudes downward from the bottom portion 21 of the base 2. The first extending portion 6*c* is in contact with the front surface of the terminal support portion 22*a*. The second extending portion 6*d* faces the first extending portion 6*c* in the front-rear direction. The second extending portion 6*d* is connected to the contact support portion 6*b* and protrudes outward from the base 2. The second extending portion 6*d* bends downward from the rear end of the contact support portion 6*b* and protrudes downward from the bottom portion 21 of the base 2. The second extending portion 6*d* is in contact with the rear surface of the terminal support portion 22*a*. The pair of external connection portions 6*e* are disposed at the lower end of the first extending portion 6*c* and the lower end of the second extending portion 6*d*, and are electrically connected to an external device (not shown).

The second fixed terminal 7 is disposed apart from the first fixed terminal 6 in the left-right direction. The second fixed terminal 7 has the same shape as the first fixed terminal 6. The second fixed terminal 7 includes a second fixed contact 7*a*, a contact support portion 7*b*, a first extending portion 7*c*, a second extending portion 7*d*, and a pair of external connecting portions 7*e*. Since each configuration of the second fixed terminal 7 is the same as each configuration of the first fixed terminal 6, the description thereof will be omitted.

The movable contact piece 8 extends in the left-right direction. The longitudinal direction of the movable contact piece 8 coincides with the left-right direction. The lateral direction of the movable contact piece 8 coincides with the front-rear direction. The movable contact piece 8 is disposed above the first fixed terminal 6 and the second fixed terminal 7.

The movable contact piece 8 includes a first movable contact 8*a* and a second movable contact 8*b*. The first movable contact 8*a* faces the first fixed contact 6*a* in the up-down direction and can make contact with the first fixed contact 6*a*. The second movable contact 8*b* faces the second fixed contact 7*a* in the up-down direction and can make contact with the second fixed contact 7*a*. In the present embodiment, the first movable contact 8*a* and the second movable contact 8*b* are fixed by being caulked to the movable contact piece 8, but the first movable contact 8*a* and the second movable contact 8*b* may be integrated with the movable contact piece 8.

The movable contact piece 8 is movable in a moving direction including a Z1 direction from the first movable contact 8*a* toward the first fixed contact 6*a* and a Z2 direction from the first fixed contact 6*a* toward the first movable contact 8*a*. In the present embodiment, the movable contact piece 8 is movable in the up-down direction. The movable contact piece 8 is connected to the movable member 9. The movable contact piece 8 penetrates the movable member 9 in the left-right direction. The movable contact piece 8 is relatively movable with respect to the movable member 9 in the up-down direction.

The movable member 9 holds the movable contact piece 8. The movable member 9 extends in the up-down direction. The movable member 9 is disposed at the center of the movable contact piece 8 in the left-right direction. The movable member 9 is made of an insulating material such as resin. The upper end of the movable member 9 is connected to the drive device 4. The movable member 9 can move in the moving direction including the Z1 direction and the Z2 direction. In this embodiment, the movable member can move in the up-down direction.

Here, as shown in FIG. 4, the base 2 includes a recess 25 and a guide portion 26. The recess 25 is disposed between the first wall portion 23 and the second wall portion 24. The recess 25 is formed so as to be recessed downward from the upper surface of the bottom portion 21. The recess 25 opens upward. The recess 25 is formed in a non-circular shape when viewed from the up-down direction. The guide portion 26 guides the movement of the movable member 9 in the up-down direction. The guide portion 26 is constituted by a portion of the recess 25. The guide portion 26 is constituted by the inner surface of the recess 25. The guide portion 26 includes a circular portion 26*a* and a convex portion 26*b* that protrudes outward in the front-rear direction from the circular portion 26*a*.

The movable member 9 is guided to move in the up-down direction by the guide portion 26. The movable member 9 is restricted from moving in the left-right direction by the guide portion 26, and is restricted from rotating about the axis of the movable member 9 along the moving direction.

The movable member 9 includes a first overlapping portion 31 and a second overlapping portion 32. The first overlapping portion 31 is provided at the lower end of the movable member 9. The first overlapping portion 31 is formed of an insulating material such as resin. In the open state where the first movable contact 8*a* is separated from the first fixed contact 6*a*, the first overlapping portion 31 overlaps with the base 2 in the longitudinal direction of the movable contact piece 8 between the first fixed terminal 6 and the second fixed terminal 7.

As shown in FIGS. 1 to 3, the open state is a state in which the first movable contact 8*a* is separated from the first fixed contact 6*a* and the second movable contact 8*b* is separated from the second fixed contact 7*a*. The closed state is a state in which the first movable contact 8*a* is in contact with the first fixed contact 6*a* and the second movable contact 8*b* is in contact with the second fixed contact 7*a*.

The first overlapping portion 31 is disposed between the first wall portion 23 and the second wall portion 24. The entire first overlapping portion 31 overlaps with the first wall portion 23 and the second wall portion 24 when viewed from the left-right direction. The lower end of the first overlapping portion 31 is located below the upper end of the first wall portion 23 and the upper end of the second wall portion 24 in the open state and the closed state. The first overlapping portion 31 is disposed inside the recess 25. The first overlapping portion 31 slides in the up-down direction with respect to the guide portion 26.

The first overlapping portion 31 has a shape along the shape of the guide portion 26, and is guided by the guide portion 26. Specifically, the first overlapping portion 31 includes a circular portion 31*a* and a convex portion 31*b* protruding in the front-rear direction from the circular portion 31*a*. The first overlapping portion 31 includes a spring housing portion 31*c*. The spring housing portion 31*c* is open downward. The spring housing portion 31*c* is recessed upward from the lower surface of the first overlapping portion 31.

The second overlapping portion 32 is formed of an insulating material such as resin. The second overlapping portion 32 is disposed above the first overlapping portion 31. The second overlapping portion 32 is disposed below the movable contact piece 8. The second overlapping portion 32 overlaps with the first fixed contact 6*a* in the longitudinal direction of the movable contact piece 8 between the first fixed terminal 6 and the second fixed terminal 7 in the open state. In the present embodiment, as shown in FIG. 2, the second overlapping portion 32 overlaps with the first movable contact 8*a*, the contact support portions 6*b*, 7*b*, and the second movable contact 8*b* in the left-right direction in the open state. The second overlapping portion 32 protrudes in the lateral direction of the movable contact piece 8 from the first fixed terminal 6 and the second fixed terminal 7 when viewed from the longitudinal direction of the movable contact piece 8.

That is, in the present embodiment, the second overlapping portion 32 protrudes in the front-rear direction from the first fixed terminal 6 and the second fixed terminal 7 when viewed from the left-right direction.

The contact spring 10 is a coil spring and urges the movable contact piece 8 in the contact direction (downward in the present embodiment). The contact spring 10 is housed inside the movable member 9.

The drive device 4 is disposed behind the contact device 3. The drive device 4 moves the movable contact piece 8 in the up-down direction via the movable member 9. The drive device 4 includes a coil 4*a*, a spool 4*b*, a fixed iron core 4*c*, a yoke 4*d*, a movable iron piece 4*e*, a hinge spring 4*f*, and a return spring 4*g*.

The coil 4*a* is wound around the outer circumference of the spool 4*b*. The spool 4*b* extends in the up-down direction. The fixed iron core 4*c* is disposed on the inner peripheral portion of the spool 4*b*. The yoke 4*d* is disposed so as to cover the rear of the coil 4*a*. The yoke 4*d* is substantially L-shaped when viewed from the left-right direction. The yoke 4*d* is connected to the lower end of the fixed iron core 4*c*.

The movable iron piece 4*e* is rotatably supported by the yoke 4*d* via the hinge spring 4*f*. The movable iron piece 4*e* rotates with the upper end of the yoke 4*d* as a fulcrum. The right end of the movable iron piece 4*e* is disposed above the movable member 9. The movable iron piece 4*e* is disposed above the fixed iron core 4*c*. The hinge spring 4*f* urges the movable iron piece 4*e* in a direction away from the fixed iron core 4*c*. The return spring 4*g* is housed in the spring housing portion 31*c* and the recess 25 of the base 2. The return spring 4*g* urges the movable member 9 in the opening direction (upward in the present embodiment).

Next, the operation of the electromagnetic relay 1 will be described. In the open state in which no voltage is applied to the coil 4*a*, the movable member 9 is pressed in the opening direction by the elastic force of the hinge spring 4*f* and the return spring 4*g*. Therefore, the first movable contact 8*a* is separated from the first fixed contact 6*a*, and the second movable contact 8*b* is separated from the second fixed contact 7*a*.

When a voltage is applied to the coil 4*a* whereby the drive device 4 is excited, the movable iron piece 4*e* is attracted to the fixed iron core 4*c* and rotates, and the movable member 9 is pressed in the contact direction by the movable iron piece 4*e*. As a result, the movable member 9 moves in the contact direction against the elastic forces of the hinge spring 4*f* and the return spring 4*g*. As the movable member 9 moves in the contact direction, the contact spring 10 moves in the contact direction. As a result, the movable contact piece 8 moves in the contact direction, such that the first movable contact 8*a* comes into contact with the first fixed contact 6*a*, and the second movable contact 8*b* comes into contact with the second fixed contact 7*a*. When the application of the voltage to the coil 4*a* is stopped, the movable member 9 moves in the opening direction by the elastic force of the hinge spring 4*f* and the return spring 4*g*.

In this electromagnetic relay 1, in the open state where the first movable contact 8*a* is separated from the first fixed contact 6*a*, the first overlapping portion 31 of the movable member 9 overlaps with the base 2 in the longitudinal direction of the movable contact piece 8 between the first fixed terminal 6 and the second fixed terminal 7 That is, since the first fixed terminal 6 and the second fixed terminal 7 can be partitioned by the first overlapping portion 31 and the base 2, it is possible to suppress a high temperature gas from staying between the first fixed terminal 6 and the second fixed terminal 7. Thus, it is possible to suppress deterioration of the insulation performance between the first fixed terminal 6 and the second fixed terminal 7 due to the high temperature gas. As a result, it is possible to prevent a short circuit between the first fixed terminal 6 and the second fixed terminal 7.

Further, in the present embodiment, since the second overlapping portion 32 protrudes in the front-rear direction from the first fixed terminal 6 when viewed from the left-right direction, it is possible to further prevent the short circuit between the first fixed terminal 6 and the second fixed terminal 7.

While preferred embodiment of the electromagnetic relay according to one aspect of the present invention have been described above, it should be understood that the present invention is not limited to the above embodiment, and various changes can be made without departing from the gist of the invention. For example, the configuration of the contact device 3 or the drive device 4 may be changed.

In the above embodiment, the entire movable member 9 is made of a resin material, but the movable member 9 may have at least the first overlapping portion 31 or the second overlapping portion 32 made of a resin material.

Figure 6:
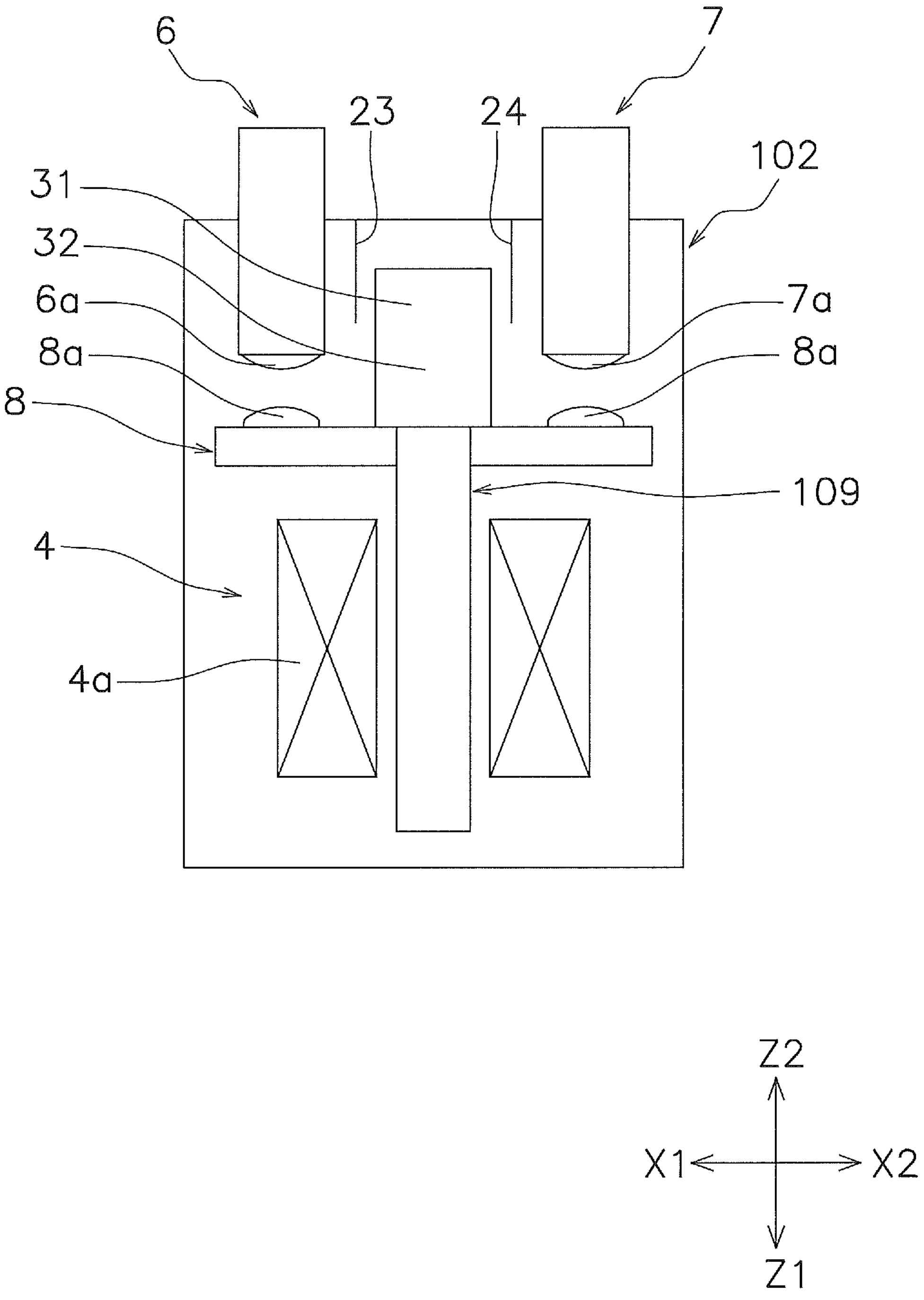
FIG. 6 is a schematic diagram of an electromagnetic relay according to a modification.
Figure 7:
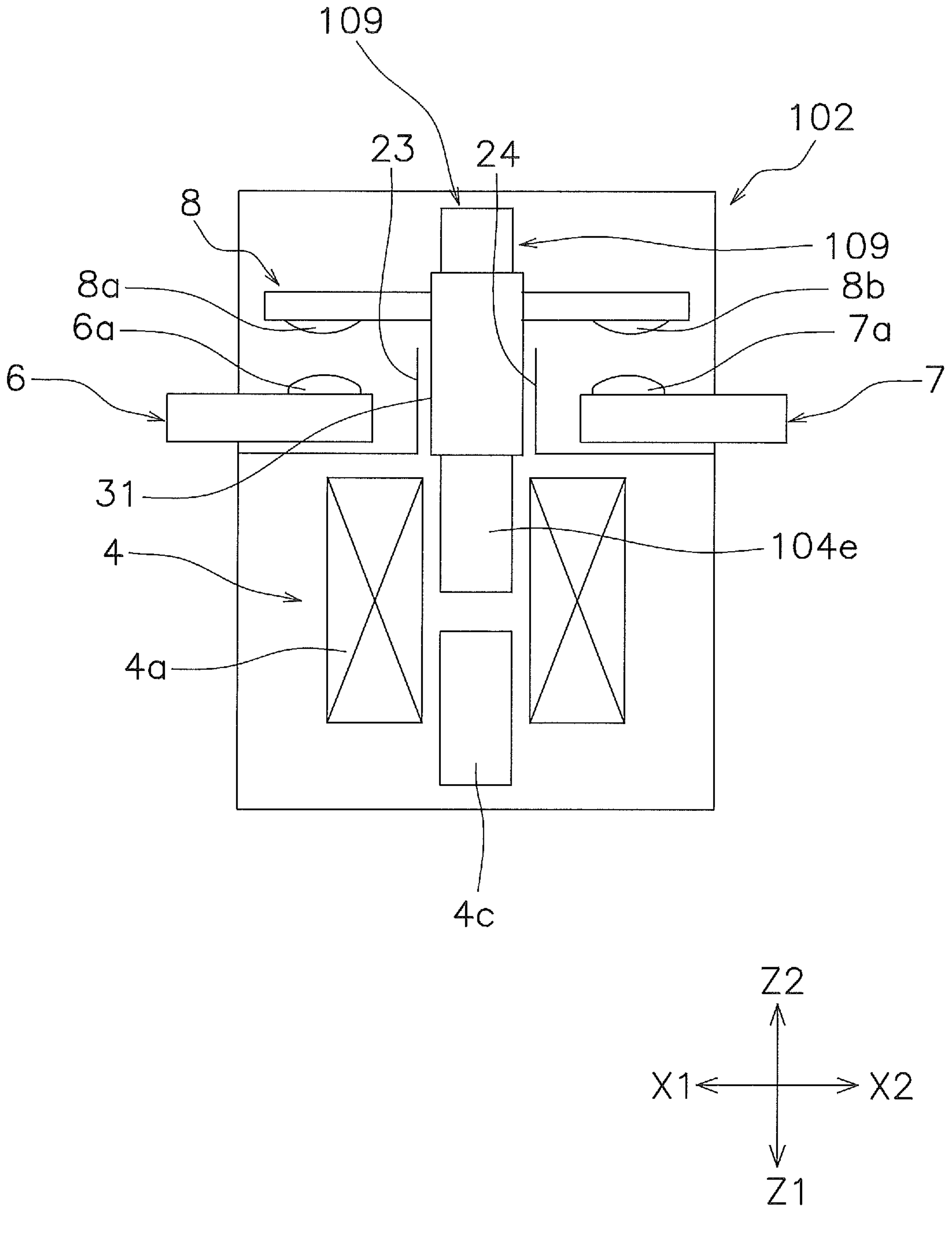
FIG. 7 is a schematic diagram of an electromagnetic relay according to a modification.

In the above embodiment, the electromagnetic relay 1 is a hinge type, but as shown schematically in FIGS. 6 and 7, the present invention may be applied to a plunger type electromagnetic relay. For example, the present invention may be applied to an electromagnetic relay configured to push the movable member 9 toward the first fixed contact 6*a* and the second fixed contact 7*a* as shown in FIG. 6, or to pull the movable member 9 toward the drive device 4 as shown in FIG. 7.

In the example shown in FIG. 6, the support member that supports the first fixed terminal 6 and the second fixed terminal 7 is the case 102 in which the movable contact piece 8 is housed. Further, the first fixed terminal 6 and the second fixed terminal 7 are cylindrical terminals. The first wall portion 23 and the second wall portion 24 extend downward from the case 102. The movable member 109 is a shaft member connected to the movable contact piece 8. In the example shown in FIG. 7, the movable member 109 is fixed to the movable iron core 104*e*. In FIGS. 6 and 7, the configurations facing the configurations of the embodiments are designated by the same reference numerals as those of the embodiments.

Figure 8:
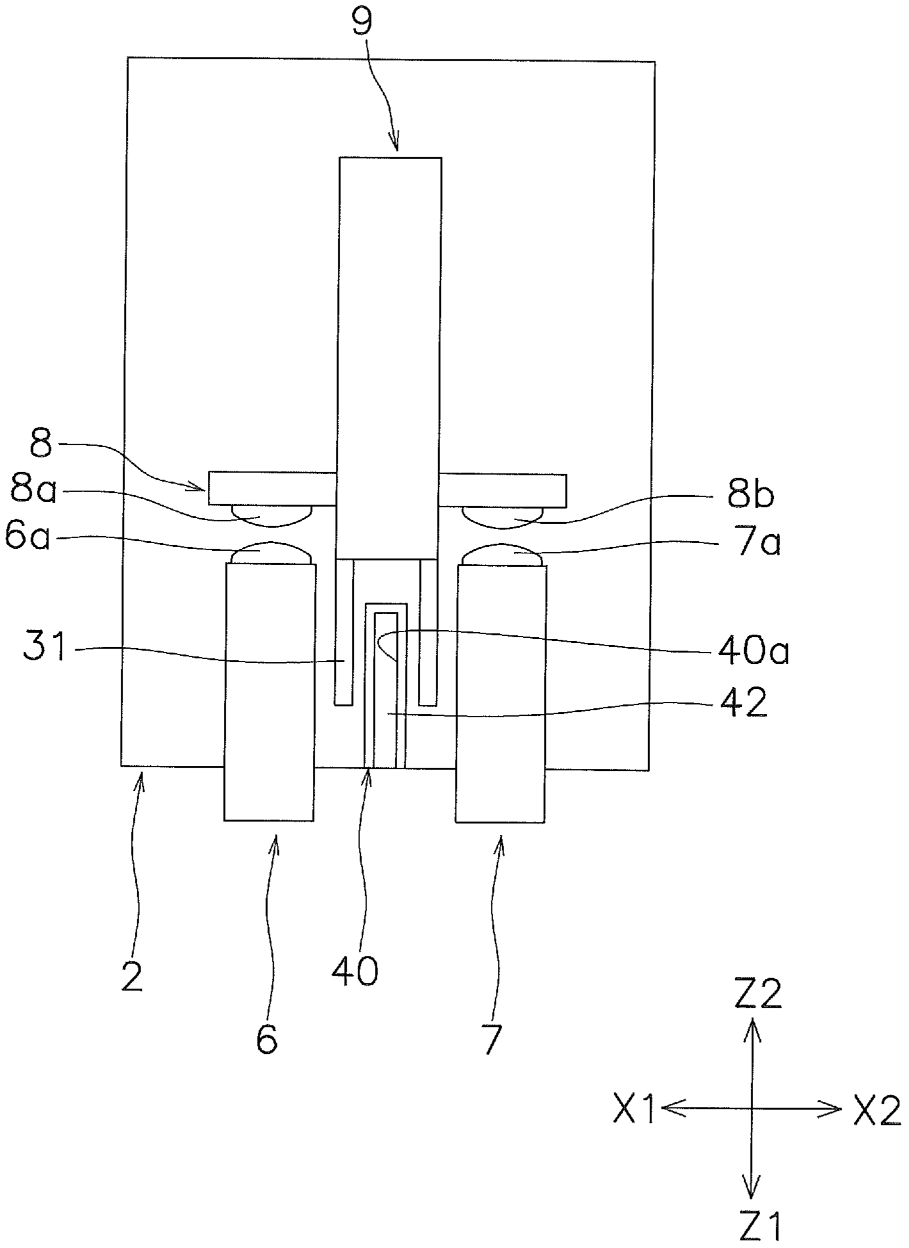
FIG. 8 is a schematic diagram of an electromagnetic relay according to a modification.

The shape of the first overlapping portion 31 of the movable member 9 may be changed. The first overlapping portion 31 is not necessarily be guided to the base 2. Further, the first overlapping portion 31 may not include the spring housing portion 31*c*. In the example shown in FIG. 8, the first overlapping portion 31 has a shape that surrounds the wall portion 40 formed between the first fixed terminal 6 and the second fixed terminal 7 from the left-right direction. The first overlapping portion 31 is disposed so as to sandwich the wall portion 40 from the left-right direction. In this case, the first overlapping portion 31 may slide in the up-down direction with respect to the outer peripheral surface of the wall portion 40. The wall portion 40 protrudes upward from the bottom portion 21 of the base 2 and extends in the circumferential direction. The wall portion 40 includes a magnet housing portion 40*a* configured to house the permanent magnet 42.

REFERENCE NUMERALS

1 Electromagnetic relay
2 Base (example of support member)
4*e* return spring
6 First fixed terminal
6*a* First fixed contact
7 Second fixed terminal
7*a* Second fixed contact
8 Movable contact piece
8*a* First fixed contact
8*b* Second fixed contact
26 Guide portion
31 First overlapping portion
31*c* Spring housing portion
32 Spring housing portion
32 Second overlapping portion
40 Wall portion
40*a* Housing portion

The invention claimed is:

1. An electromagnetic relay, comprising:

a support member made of an insulating material;

a first fixed terminal supported by the support member, the first fixed terminal including a first fixed contact;

a second fixed terminal supported by the support member at a position apart from the first fixed terminal, the second fixed terminal including a second fixed contact;

a movable contact piece including a first movable contact facing the first fixed contact and a second movable contact facing the second fixed contact; and a movable member connected to the movable contact piece, the movable member including a first overlapping portion made of an insulating material, the first overlapping portion disposed between the first fixed terminal and the second fixed terminal, the first overlapping portion overlapping with the support member when viewed from a longitudinal direction of the movable contact piece in an open state where the first movable contact is separated from the first fixed contact, wherein the movable member further includes a second overlapping portion made of an insulating material, the second overlapping portion disposed between the first fixed terminal and the second fixed terminal, the second overlapping portion overlapping with the first fixed contact when viewed from the longitudinal direction of the movable contact piece in the open state, the second overlapping portion protruding from the first fixed contact in a lateral direction of the movable contact piece when viewed from the longitudinal direction of the movable contact piece, the second overlapping portion having a dimension in the lateral direction of the movable contact piece larger than a dimension of the first fixed terminal in the lateral direction of the movable contact piece.

2. An electromagnetic relay, comprising:

a support member made of an insulating material;

a first fixed terminal supported by the support member, the first fixed terminal including a first fixed contact;

a second fixed terminal supported by the support member at a position apart from the first fixed terminal, the second fixed terminal including a second fixed contact;

a movable contact piece including a first movable contact facing the first fixed contact and a second movable contact facing the second fixed contact; and a movable member connected to the movable contact piece, the movable member including a first overlapping portion made of an insulating material, the first overlapping portion disposed between the first fixed terminal and the second fixed terminal, the first overlapping portion overlapping with the support member when viewed from a longitudinal direction of the movable contact piece in an open state where the first movable contact is separated from the first fixed contact, wherein the movable member is configured to move in a moving direction including a first direction extending from the first movable contact toward the first fixed contact and a second direction extending from the first fixed contact toward the first movable contact, the support member includes a guide portion made of an insulating material and configured to guide movement of the movable member in the moving direction, and the first overlapping portion of the movable member is disposed in contact with an inner surface of the guide portion and slides with respect to the guide portion.

3. The electromagnetic relay according to claim 2, wherein the movable member is restricted from rotating around an axis along the moving direction by the guide portion.

4. The electromagnetic relay according to claim 2, further comprising:

a return spring disposed between the support member and the movable member, the return spring configured to urge the movable member in the second direction, wherein the first overlapping portion of the movable member includes a spring housing portion configured to house the return spring, the spring housing portion opening toward the first direction.

5. An electromagnetic relay, comprising:

a support member made of an insulating material;

a first fixed terminal supported by the support member, the first fixed terminal including a first fixed contact;

a second fixed terminal supported by the support member at a position apart from the first fixed terminal, the second fixed terminal including a second fixed contact;

a movable contact piece including a first movable contact facing the first fixed contact and a second movable contact facing the second fixed contact; and a movable member connected to the movable contact piece, the movable member including a first overlapping portion made of an insulating material, the first overlapping portion disposed between the first fixed terminal and the second fixed terminal, the first overlapping portion overlapping with the support member when viewed from a longitudinal direction of the movable contact piece in an open state where the first movable contact is separated from the first fixed contact, wherein the support member includes a wall portion disposed between the first fixed terminal and the second fixed terminal, and the first overlapping portion has a shape surrounding the wall portion from the longitudinal direction of the movable contact piece.

6. The electromagnetic relay according to claim 5, wherein the wall portion of the support member includes a magnet housing portion configured to house a permanent magnet.

* * * * *